United States Patent [19]

Komatsu et al.

[11] 4,191,015
[45] Mar. 4, 1980

[54] UNIVERSAL TOROIDAL CIRCUIT FOR HYDRAULIC TORQUE CONVERTERS

[75] Inventors: Mitsuaki Komatsu; Akinori Yokoyama, both of Yokohama, Japan

[73] Assignee: Kabushiki Kaisha Komatsu Seisakusho, Tokyo, Japan

[21] Appl. No.: 931,430

[22] Filed: Aug. 7, 1978

[30] Foreign Application Priority Data

Aug. 12, 1977 [JP] Japan ................................ 52-96096

[51] Int. Cl.² ............................................. F16D 33/00
[52] U.S. Cl. ........................................ 60/361; 60/362; 60/367
[58] Field of Search ................ 60/327, 334, 353, 361, 60/362, 364, 367

[56] References Cited

U.S. PATENT DOCUMENTS

| | | | |
|---|---|---|---|
| 2,357,338 | 9/1944 | Lysholm | 60/367 |
| 3,071,928 | 1/1963 | Dundore et al. | 60/361 |
| 3,105,396 | 10/1963 | Dundore et al. | 60/345 X |
| 3,125,857 | 3/1964 | Schneider | 60/361 |
| 3,360,935 | 1/1968 | Schneider | 60/361 |
| 3,888,082 | 6/1975 | Haide | 60/361 |

FOREIGN PATENT DOCUMENTS

38-10468  6/1963  Japan .

*Primary Examiner*—Edgar W. Geoghegan
*Attorney, Agent, or Firm*—Armstrong, Nikaido, Marmelstein & Kubovcik

[57] ABSTRACT

The improved design of a closed toroidal circuit enabling various arrangements of bladed converter members or elements, with many of them standardized for the economical manufacture of various types of converters. The shapes of the outer and inner walls of the toroidal circuit in a radial converter plane are determined by a construction trapezoid and construction rectangle, respectively, that are specified by a system of rectangular coordinates and which have their corners rounded by arcs of specified radii. The outer and inner walls are tangent to an infinite number of circles the diameter of each of which is formulated in relation to the distance of the circle center from the converter axis and the maximum radius of the circuit.

13 Claims, 15 Drawing Figures

UNIVERSAL TOROIDAL CIRCUIT FOR HYDRAULIC TORQUE CONVERTERS

BACKGROUND OF THE INVENTION

1. Field of the Invention

Our invention deals with hydraulic torque converters and is directed more specifically to the improved design of a closed toroidal circuit of a converter through which the working fluid is recirculated for hydrodynamic power transmission. The improved circuit design according to our invention permits a variety of arrangements of impeller, turbine and reactor members or elements affording a variety of constructional and operational characteristics.

2. Description of the Prior Art

Hydraulic torque converters of various designs have been suggested and employed for various applications. U.S. Pat. No. 3,125,857 to Schneider, for example, proposes a torque converter which permits the impeller, turbine and reactor members to be separately cast in one piece. The blades of all the converter members are curved, but not twisted, between their inlet and outlet tips. Therefore, in the making of sand cores preparatory to separately casting the converter members, the master blades therefor can be easily removed from the hardened cores. Although the master blades for the impeller and turbine blades can be removed altogether in the axial direction, however, the stator master blades must be removed individually in the radially inward direction.

The converter which has been actually manufactured according to this Schneider patent has a stall torque ratio of approximately 3.3 at a maximum. It permits the mounting of a free-wheel or overrunning clutch in a position radially inwardly of the toroidal circuit, for convenient use as a compact, two-phase machine.

U.S. Pat. No. 3,360,935, also to Schneider, proposes a torque converter designed to absorb increased horsepower. The impeller, turbine and reactor members of this converter are also easy to manufacture since their blades are not twisted. Depending on blade design, moreover, the converter members can be formed by casting with the use of integral cores, as in the first mentioned Schneider patent. The stall torque ratio of the converter according to this second mentioned Schneider patent can be made as high as five or more, and its speed ratio (output speed/input speed) can be made more than two. An additional feature resides in the fact that at a constant input speed, the input or primary torque does not vary so much with changes in speed ratio.

U.S. Pat. No. 3,071,928 to Dundore et al. discloses a torque converter designed to afford the application of maximum torque over a widely varying torque range. The impeller and turbine members of this converter are formed by casting, and its reactor member by sheet-metal working on drawn pieces. The manufacturing costs of the converter are therefore comparatively low. Some converter models manufactured in accordance with this Dundore et al. patent have a maximum stall torque ratio of slightly more than three.

The number of turbine blades according to the Dundore et al. patent is comparatively small, being specified as ranging from 24 to 30. The radial length of the turbine blades must therefore be made considerably great for proper absorption of the momentum of the working fluid by the turbine. This necessitates reduction in the minimum or inner radius of the toroidal circuit of the converter. Thus, the width of the circuit must also be reduced as will become apparent from the following considerations.

In the toroidal circuit of the converter proposed by Dundore et al., the diameter D of a circle inscribed between the outer and inner walls of the circuit and located in the radially outermost position thereof is defined by the formula:

$$D = \frac{0.138\pi R^2}{2\pi r}$$

wherein R is the maximum or outer radius of the circuit, and r is the distance of the center of the circle from the axis of the converter. Contrastingly, according to the first mentioned Schneider patent (U.S. Pat. No. 3,125,857):

$$D = \frac{(0.2 \pm 0.03)\pi R^2}{2\pi r}$$

A comparison of the above two formulas will show that the width of the circuit according to the Dundore et al. patent is about 20 to 40 percent less than that according to the Schneider patent. The amount of the fluid recirculating in the former circuit is therefore considerably less than that of the fluid in the latter circuit. In other words, for a given maximum radius of the circuit, the Dundore et al. converter is capable of transmitting less power. Stated conversely, the converter must be of greater size for transmitting a given power.

As mentioned, the turbine blades of the Dundore et al. converter need to be of increased radial length because of their comparatively small number. The minimum radius of its circuit is 0.268 R. This is far less than the minimum radius of the circuit according to the first mentioned Schneider patent, which radius is approximately 0.351 R. It is therefore practically impossible to mount an overrunning clutch radially inwardly of the circuit in the Dundore et al. converter.

A further torque converter suggested by U.S. Pat. No. 3,105,396, also to Dundore et al., is of the dual reactor type. Essentially, it is identical with the first mentioned Dundore et al. converter except that the second reactor element is disposed radially inwardly of the impeller member. The first and second reactor elements can both be equipped with overrunning clutches for three-phase operation. As explained in connection with the first mentioned Dundore et al. patent, however, the minimum radius of the circuit is so small that the clutches cannot possibly be disposed radially inwardly thereof. Other characteristics are also identical with those of the first mentioned Dundore et al. converter.

Japanese Patent Publication No. 38-10468 also discloses a torque converter of the dual reactor type. In the arrangement of its members the converter according to this Japanese patent is identical with the converter according to the second mentioned Schneider U.S. Pat. No. 3,360,935 except that the former has an additional reactor disposed in the outer, axial flow portion of the circuit. Its characteristics are also similar to those of the second mentioned Schneider et al. converter.

An additional prior art converter construction, in very widespread use, is one in which the outer and inner walls of the toroidal circuit are substantially circular in shape and which has a split reactor. This split reactor is capable of functioning either as an integral member or as separate elements, with overrunning clutches mounted radially inwardly of the circuit. Although of great utility as a compact, polyphase machine, the converter has twisted blades, which of course are difficult of manufacture.

The above enumerated prior art torque converters are considered typical of those in current use. In view of their constructional and operational characteristics, these converters may be put to selective use to suit the particular applications intended. A problem arise, however, that the toroidal circuits of the listed converters are all more or less different in shape. No standardized parts or components can be employed for the different converters. They must be designed and manufactured separately, at significantly increased costs.

SUMMARY OF THE INVENTION

It is an object of our invention to make the shape of the toroidal circuit of a hydraulic torque converter universal, i.e., adaptable for various types of converters, and hence to make possible the standardization of many parts and components for use in different types of converters.

Another object of our invention is to provide a toroidal circuit of the character indicated whose shape is modifiable in a specified way without any substantial alteration of the expected performance characteristics, so that the circuit has increased adaptability to various types, and sizes, of torque converters.

A further object of our invention is to provide a toroidal circuit of the character indicated which has a minimum or inner diameter sufficiently large to permit the mounting of an overrunning clutch or clutches radially inwardly of the circuit.

A still further object of our invention is to provide hydraulic torque converters, constructed in accordance with the improved toroidal circuit of the character indicated, that are characterized by improved performance characteristics such as greater output horsepower, higher stall torque ratio, and higher efficiency.

Briefly, our invention is directed to a toroidal circuit of improved design having outer and inner walls which are to be formed mostly by the shells and cores, respectively, of the impeller, turbine, and reactor members or elements of a torque converter. The shape of the toroidal circuit in a radial converter plane is specified, by relating its outer wall to a construction or reference trapezoid and its inner wall to a construction or reference rectangle. Both construction trapezoid and construction rectangle are determined by a system of rectangular coordinates which employs the axis of the converter as the X-axis and a line drawn perpendicular thereto as the Y-axis. The corners of the construction trapezoid and rectangle are rounded with arcs of specified radii to define the outer and inner walls of the circuit.

According to a further feature of our invention, the axial length of the radially outer and inner, axial flow portions of the above defined toroidal circuit can be increased or decreased without entailing any substantial change in performance characteristics.

The toroidal circuit of our invention, inclusive of modifications as above, is universal, permitting a wide variety of arrangements of impeller, turbine and reactor members or elements. It is thus possible to provide torque converters of varied structural and performance characteristics, as will be subsequently disclosed. Many standardized parts and components can be employed interchangeably for the assemblage of the various converters. Although in some instances some parts or components are not strictly interchangeable, they can be manufactured by the use of standardized casting or molding dies or the like.

The toroidal circuit of our invention is further characterized by its large minimum radius, sufficient to mount a conventional overrunning clutch or clutches radially inwardly of the circuit. This has been impossible with some prior art torque converters. By incorporating the toroidal circuit of our invention, even these prior art converters can be adapted to permit the mounting of an overrunning clutch or clutches radially inwardly of the circuit.

The above and other objects, features and advantages of our invention and the manner of attaining them will become more fully apparent, and the invention itself will best be understood, from the following description which is to be read in connection with the accompanying drawings.

DETAILED DESCRIPTION

Figure 1:
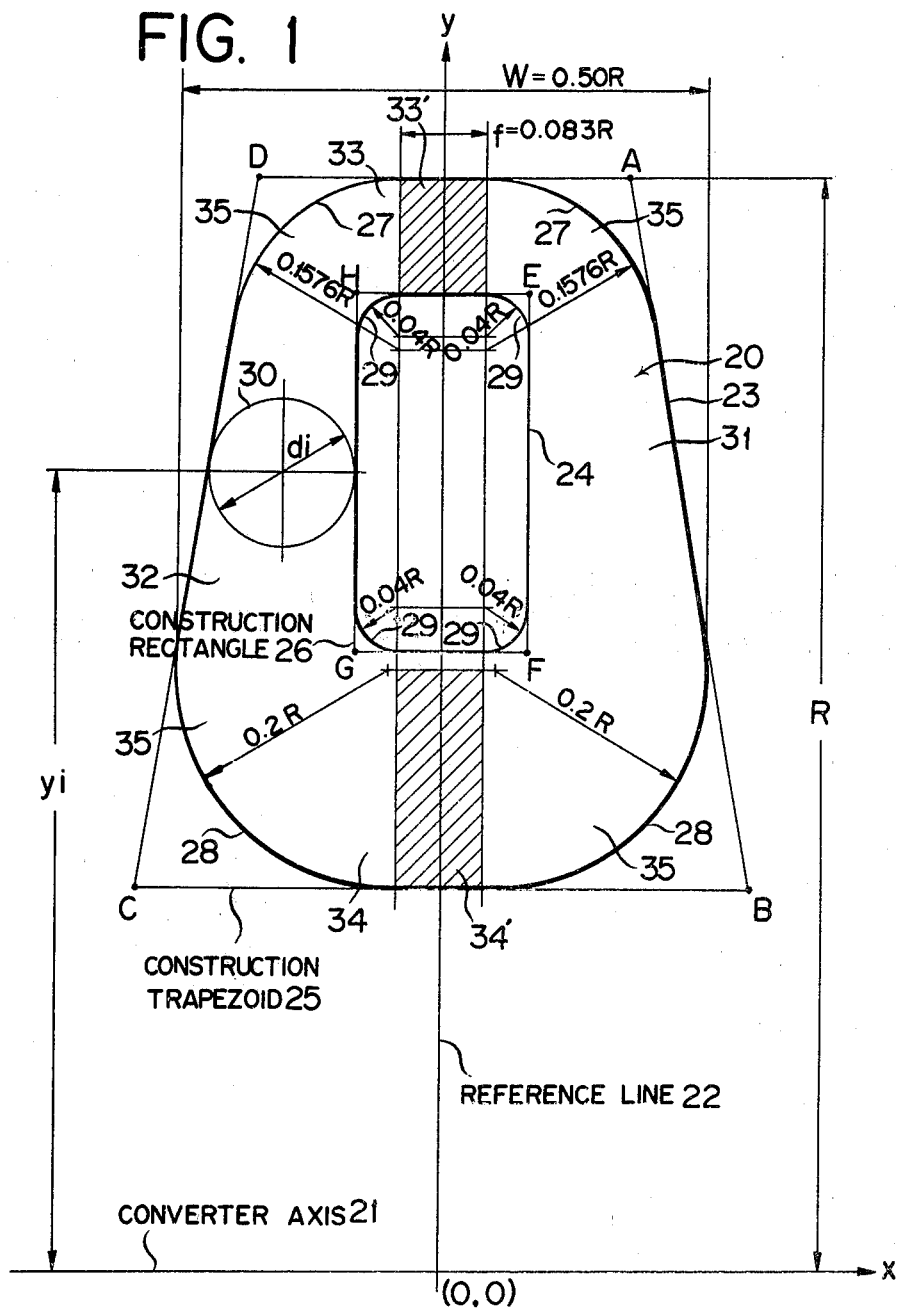
FIG. 1 is a schematic representation of the toroidal circuit according to our invention as determined by a system of rectangular coordinates in a radial converter plane.

Our invention proposes the improved shape of a closed toroidal circuit in which the working fluid of a torque converter is recirculated for power transmission. The Cartesian system of rectangular coordinates is employed in specifying the shape of the toroidal circuit in a radial plane of the converter. With reference to FIG. 1, which is a radial section of the circuit generally designated 20, the axis 21 of the converter is taken as the X-axis of the rectangular coordinate system. The Y-axis, then, is a reference line 22 drawn perpendicular to the converter axis 21. The maximum radius R of the circuit 20 is employed as the unit of length on both X- and Y-axes.

The toroidal circuit 20 has outer 23 and inner 24 walls which are to be formed at least partly by the shells and cores, respectively, of the impeller, turbine and reactor members or elements of the converter. The improved shape of the circuit 20 permits various arrangements of these converter members or elements, as will be detailed subsequently. The outer 23 and inner 24 walls of the circuit 20 are related to a reference or construction trapezoid 25 and construction rectangle 26, respectively.

The construction trapezoid 25 is bounded by lines passing, in the order given, a series of design points A, B, C and D. In the above noted rectangular coordinate system, these design points can be expressed as: A(0.1737 R, 1.0000 R), B(0.2883 R, 0.3500 R), C(−0.2883 R, 0.3500 R), and D(−0.1737 R, 1.0000 R). The thus-bonded trapezoid 25 is of bilateral symmetry with respect to the Y-axis.

Similarly, the construction rectangle 26 is bounded by lines passing, in the order given, another series of design points E, F, G and H. The coordinates for this second series of design points have the following values: E(0.0815 R, 0.8945 R), F(0.0815 R, 0.5677 R), G(−0.0815 R, 0.5677 R), and H(−0.0815 R, 0.8945 R). This construction rectangle 26 is also of bilateral symmetry with respect to the Y-axis.

The shape of the outer wall 23 of the toroidal circuit 20 in a radial converter plane is defined by rounding those two corners of the construction trapezoid 25 whose vertices lie at the design points A and D, with arcs 27 having radii of 0.1576 R, and by rounding the other two corners of the construction trapezoid whose vertices lie at the design points B and C, with arcs 28 having radii of 0.2000 R. The shape of the inner wall 24 of the circuit 20 in a radial converter plane is defined by rounding all the four corners of the construction rectangle 26 with arcs 29 having radii of 0.0400 R.

With the shape of the toroidal circuit 20 in a radial converter plane thus defined, the outer 23 and inner 24 walls of the circuit are tangent to an infinite number of circles (only one of these shown and designated 30) the diameter di of each of which is expressed by the formula:

$$di = \frac{0.2\pi R^2}{2\pi yi}$$

wherein yi is the radial distance of the center of each circle 30 from the X-axis.

The toroidal circuit 20 can be considered to be roughly composed of the following portions: (1) a pair of radial flow portions 31 and 32 which are symmetrical with respect to the Y-axis; (2) a radially outer, axial flow portion 33; (3) a radially inner, axial flow portion 34; and (4) four bend or corner portions, all designated 35, bridging the noted radial and axial flow portions 31 to 34.

Of the listed constituent portions of the circuit 20, the outer 33 and inner 34 axial flow portions include parts 33' and 34', respectively, that are indicated by the hatchings. These axial flow parts 33' and 34' are defined by those segments of the outer 23 and inner 24 walls of the circuit 20 which extend exactly parallel to the converter axis 21. The axial length f of each of the axial flow parts 33' and 34' is 0.083 R. These axial flow parts are important features of the circuit 20, as will become apparent from the following discussion.

Let it be assumed that the axial flow parts 33' and 34' of the circuit 20 are not bladed. The flow mode of the working fluid in these axial flow parts is then the so-called free flow, i.e., a flow of constant angular momentum. Since the axial flow parts 33' and 34' are parallel to the converter axis 21, the flow of constant angular momentum means an unchanging flow angle with respect to the meridian plane. Consequently, the performance of the torque converter is to be hardly affected if the axial lengths f of the axial flow parts 33' and 34' are increased or decreased to exactly the same extent.

Figure 2:
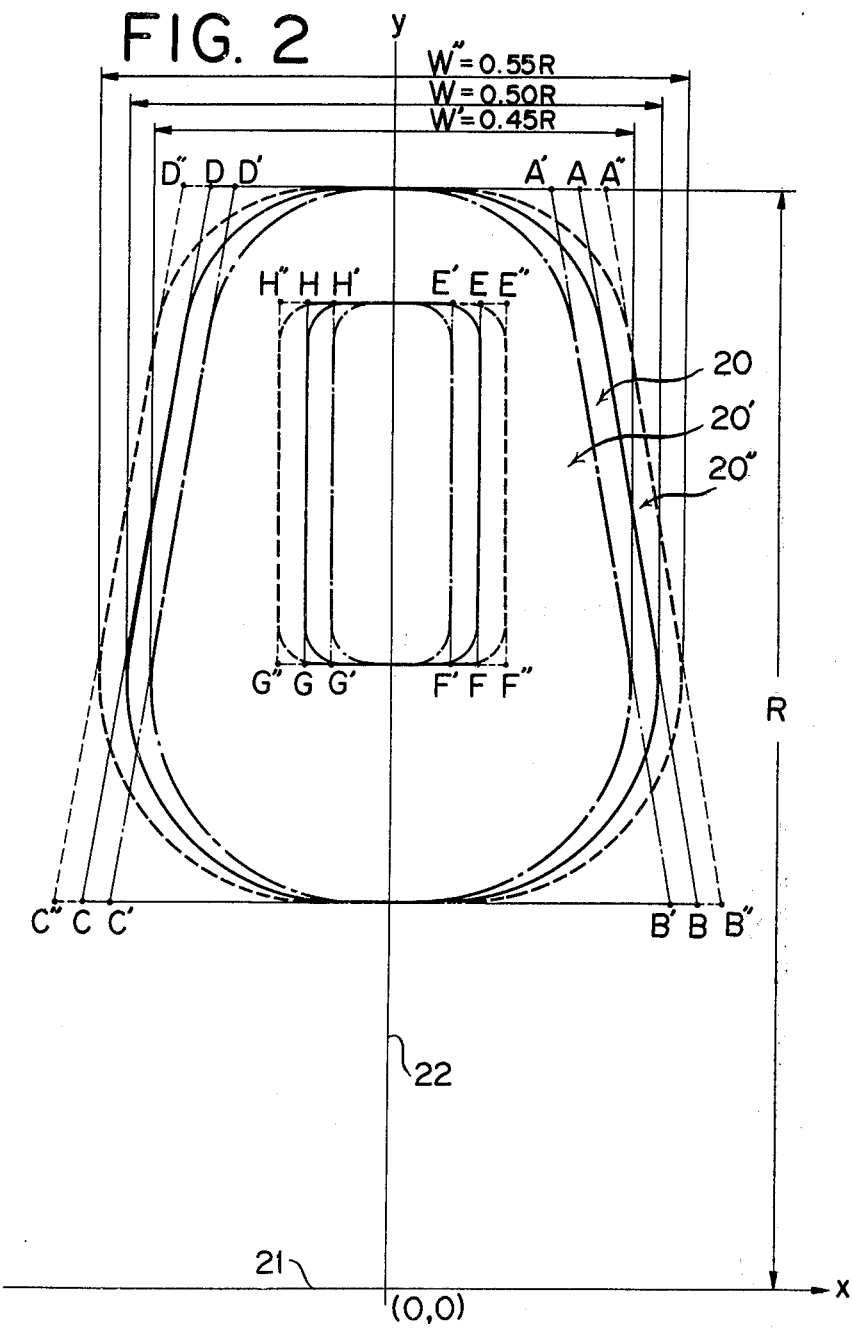
FIG. 2 is a similar representation of the toroidal circuit of FIG. 1 shown together with its two possible modifications.

FIG. 2 shows two of such modified toroidal circuits according to our invention, together with the original circuit 20 of FIG. 1 for comparison. In the original circuit 20, depicted by the full lines in FIG. 2, the maximum total width or axial length W is 0.50 R. The modified circuit 20' represented by the dot-and-dash lines in FIG. 2 has its maximum axial length W' reduced to 0.45 R. The other modified circuit 20'' represented by the dotted lines in FIG. 2, has its maximum axial length W'' increased to 0.55 R. These changes in the maximum axial length are of course made by decreasing and increasing the axial lengths f of the axial flow parts 33' and 34' of the original circuit and by correspondingly shifting the other circuit portions in both directions along the converter axis 21.

In FIG. 2 the reference characters used in connection with the original circuit 20 of FIG. 1 are given primes to denote correspondence to the modified circuit 20', and double-primes to denote correspondence to the other modified circuit 20''. It will of course be understood that the noted maximum axial length values of 0.45 R and 0.55 R are selected arbitrarily. Various other values or possible to form various other modified circuits within the scope of our invention.

What follows is the description of various types of torque converters all incorporating the improved toroidal circuits 20, 20' or 20'' of our invention.

Figure 3:
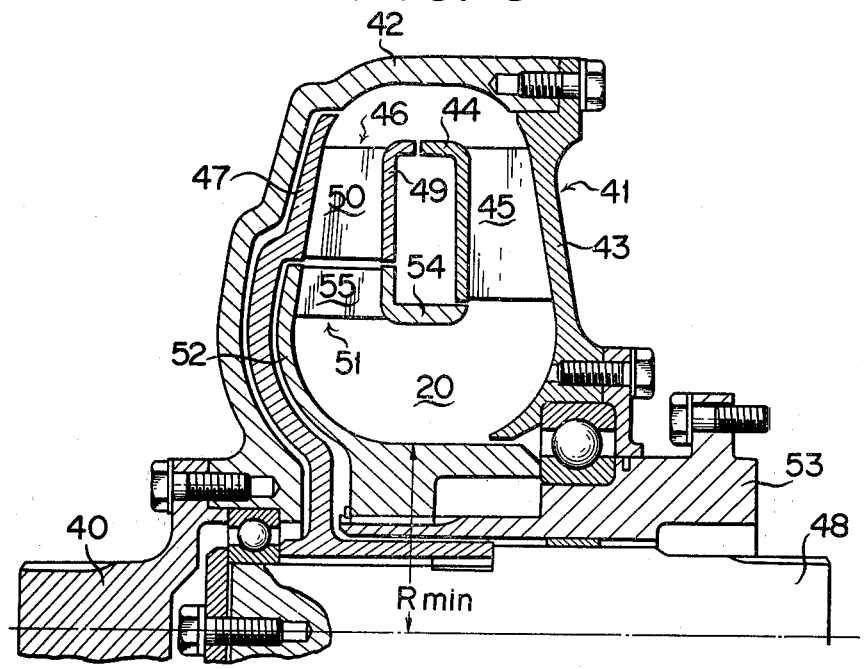
FIG. 3 is a fragmentary, radial sectional view of a torque converter incorporating the original toroidal circuit of FIG. 1.

FIG. 3 shows one such torque converter constructed in accordance with the original toroidal circuit 20. The converter includes an input shaft 40 connected to an impeller member 41 via a rotating housing 42. The impeller member 41 includes a shell 43, a core 44, and a plurality of blades 45 bridged between the shell and the core. Mounted opposite to the impeller member 41 is a turbine member 46 including a shell 47 rigidly connected to an output shaft 48, a core 49, and a plurality of blades 50 bridged between the impeller shell and core. The converter further comprises a reactor member 51 including a shell 52 rigidly connected to a stationary sleeve 53 coaxial with the output shaft 48, a core 54, and a plurality of blades 55 bridged between the reactor shell and core.

It will be seen that the toroidal circuit 20 is bounded mostly by the shells 43, 47 and 52 and cores 44, 49 and 54 of the impeller 41, turbine 46 and reactor 51 members. The impeller blades 45 are mounted in one of the pair of radial flow portions of the circuit 20. The turbine blades 50 and the reactor blades 55 are both mounted in the other radial flow portion of the circuit 20, with the turbine blades disposed radially outwardly of the reactor blades.

Figure 4:
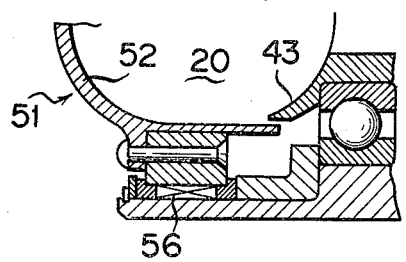
FIG. 4 is a similar view showing the torque converter of FIG. 3 as equipped with an overrunning clutch.

The minimum radius Rmin of the toroidal circuit 20 in the FIG. 3 converter is 0.35 R. This is far greater than that (0.268 R) of the converter according to the aforementioned Dundore et al. U.S. Pat. No. 3,071,928 and approximately equivalent to that of the converter according to the mentioned Schneider U.S. Pat. No. 3,125,857. As shown in FIG. 4, therefore, the reactor member 51 can be mounted on a conventional overrunning clutch 56 disposed radially inwardly of the circuit 20.

Figure 5:
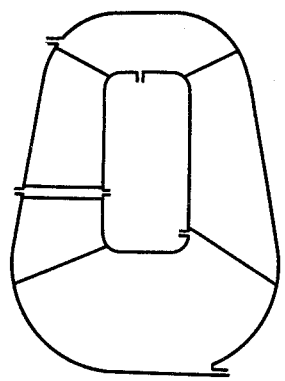
FIG. 5 is a schematic, radial sectional view of another torque converter in which only the blades of FIG. 3 converter are modified.

Although in FIG. 3 the inlet and outlet edges of the impeller 45, turbine 50 and reactor 55 blades are all shown to extend parallel to the converter axis 21, these edges may be angled with respect to the converter axis as required. The same holds true with all the converters set forth subsequently. FIG. 5 shows a modification of the FIG. 3 converter by way of example. It will be noted that except the turbine blade outlet edges and reactor blade inlet edges, all the edges of the impeller, turbine and reactor blades are angled with respect to the converter axis.

Figure 6:
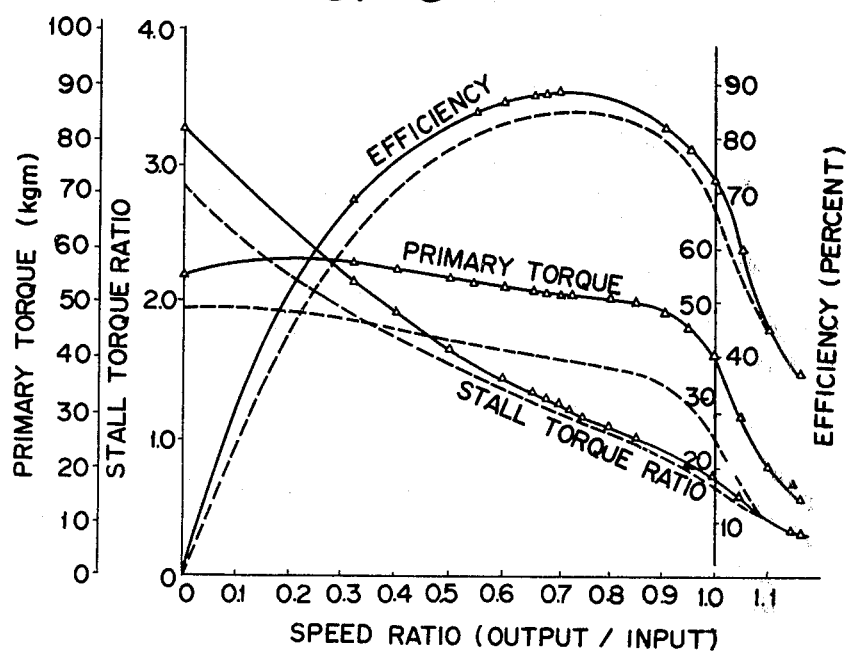
FIG. 6 is a representation of the various performance curves of the FIG. 3 converter, compared against those of a prior art converter of like design.

FIG. 6 represents the performance curves of the FIG. 3 converter and, by way of comparison, those of the prior art converter according to the mentioned Dundore et al. U.S. Pat. No. 3,071,928, both as measured actually from the manufactured models. The performance curves of the inventive converter are shown full, and those of the prior art converter shown dotted. In order to facilitate comparison, the primary or input torque values of the prior art converter have been converted into those corresponding to the same maximum circuit radius and input speed as those of the inventive converter in accordance with the well known formula governing rotary hydraulic machines:

$$tp = \alpha N^2 R^5$$

wherein tp is the primary torque, $\alpha$ is a proportional constant, and N is the input speed.

It is evident from FIG. 6 that the inventive converter has a higher primary torque, higher stall torque ratio, and higher efficiency than the prior art converter. The higher primary torque can be construed to mean, conversely, that the inventive converter requires a less size for a given torque rating.

Figure 7:
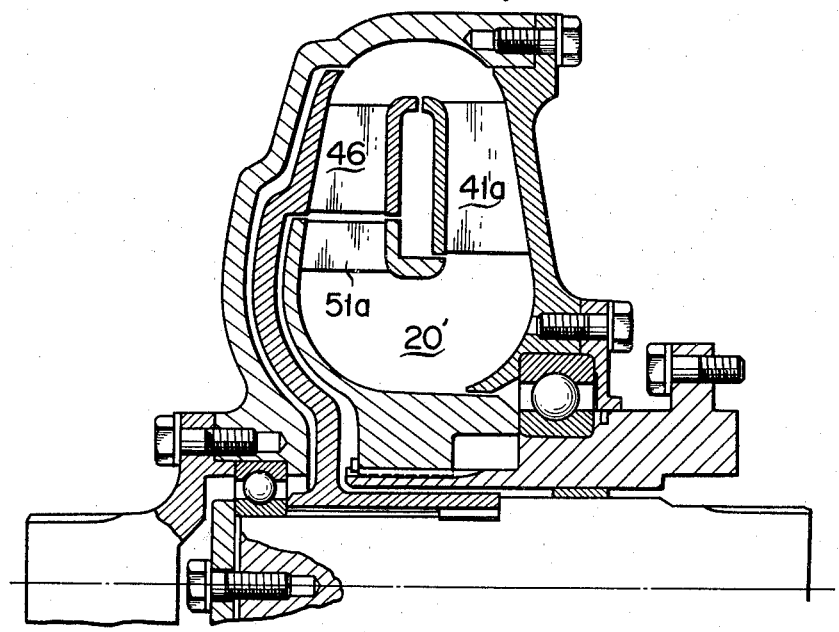
FIG. 7 is a fragmentary, radial sectional view of another torque converter similar to that of FIG. 3 but incorporating one of the two modified toroidal circuits shown in FIG. 2.

FIG. 7 shows another torque converter incorporating the modified toroidal circuit 20' of FIG. 2. Although the arrangement of its impeller 41a, turbine 46 and reactor 51a members is exactly the same as that in the FIG. 3 converter, which uses the original circuit 20, the axial length of this FIG. 7 converter is significantly less. The modified circuit 20' may thus be employed where it is required to reduce the size of a converter without substantially changing its performance characteristics. Actually, the performance characteristics of the FIG. 7 converter have been confirmed to be almost identical with those of the FIG. 3 converter.

Figure 8:
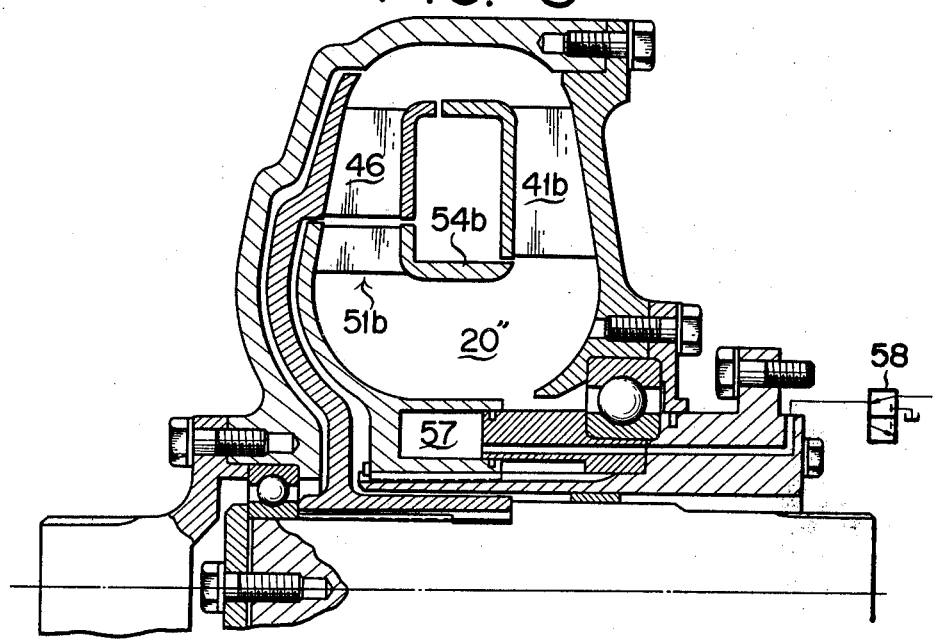
FIG. 8 is a fragmentary, radial sectional view of a further torque converter which is similar to that of FIG. 3 in the arrangement of the impeller, turbine and reactor members but which incorporates the other modified toroidal circuit of FIG. 2, the FIG. 8 converter being further characterized in that the reactor member is made axially movable between a working and a retracted position, with the reactor member shown in the working position in FIG. 8.
Figure 9:
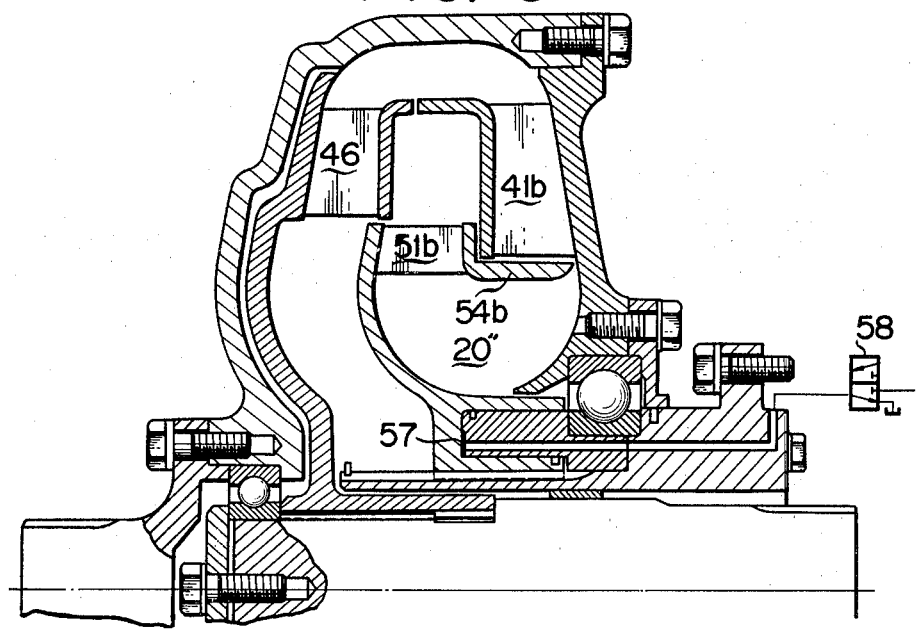
FIG. 9 is a view similar to FIG. 8 except that the reactor member is shown in the retracted position.

Still another torque converter shown in FIGS. 8 and 9 has its impeller 41b, turbine 46 and reactor 51b members arranged exactly the same way as in the FIGS. 3 and 7 converters. The FIG. 8 converter incorporates the modified toroidal circuit 20" of FIG. 2, however. Also incorporated in the FIG. 8 converter is a clutch, not shown, for directly coupling the input and output shafts. The modified circuit 20" is intended to enhance the efficiency of the converter in the coupling range, as will become apparent from the following explanation.

Upon engagement of the direct coupling clutch, the power is transmitted partly through the cluth and partly through the converter proper. The efficiency of the clutch is nearly 100 percent because of its rigid mechanical connection. Constrastingly, as will be noted from FIG. 6, the efficiency of the converter proper is only about 70 percent at a speed ratio of 1.0. The power transmitted through the clutch should therefore be maximized, and the power transmitted through the converter proper minimized, for efficient power transfer in the coupling range.

The above objective is attained by the FIGS. 8 and 9 converter, by making the reactor member 51b movable axially between working and retracted positions. In FIG. 8 is shown the reactor member 51b in the working position for operation in the torque conversion range. In this torque conversion range a hydraulic fluid under pressure is delivered from its source, not shown, into an annular actuating chamber 57 via a selector valve 58. The reactor member 51b is thus maintained in the working position under the fluid pressure in the actuating chamber 57. The working fluid is recirculated within the toroidal circuit 20" in the usual manner for hydrodynamic power transfer through the converter.

With the engagement of the direct coupling clutch, the selector valve 58 is switched as shown in FIG. 9. The fluid in the actuating chamber 57 is now exposed to the atmosphere through the selector valve 58. As is well known, in torque converters in general, the working fluid is maintained at a pressure (two to three kilograms per square centimeter) greater than the atmospheric pressure in order to prevent aeration. The reactor member 51b is caused to travel axially from the working to the retracted position by this pressure of the working fluid. The core 54b of the reactor member 51b in the retracted position closes the inlet of the impeller member 41b thereby preventing the recirculation of the working fluid through the circuit 20". Thus, in the coupling range, almost all of the input torque is transmitted efficiently through the direct coupling clutch.

It will have been noted that the turbine members of the three different converters shown in FIGS. 3, 7, 8 and 9 are designated by the same reference numeral 46. This is because the turbine members can be of identical construction. They can be standardized for use in any of the three converters.

Figure 10:
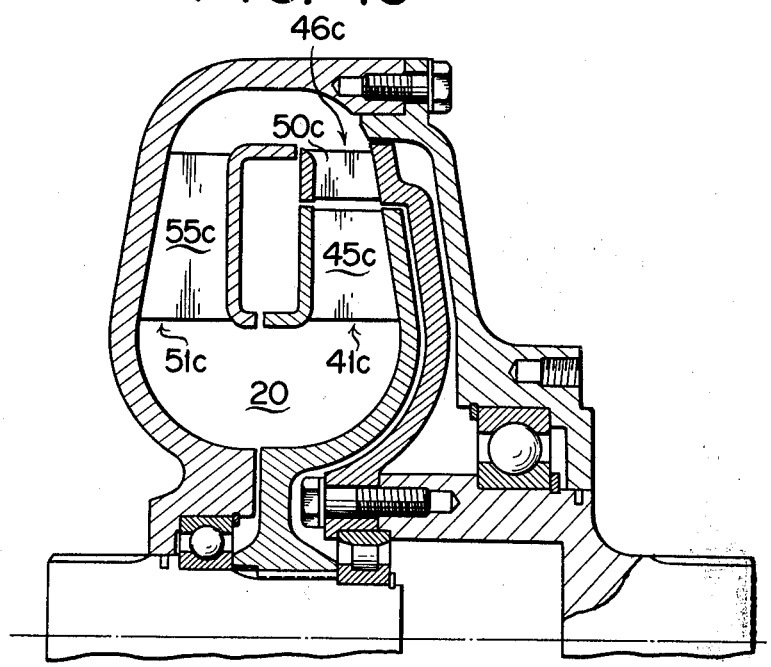
FIGS. 10, 11, 12 and 13 are fragmentary, radial sectional views of further different types of torque converters all incorporating the original toroidal circuit of FIG. 1.

FIG. 10 shows a further torque converter incorporating the original toroidal circuit 20. The impeller 41c, turbine 46c and reactor 51c members of this FIG. 10 converter are arranged in accordance with the teaching of the aforesaid Schneider U.S. Pat. No. 3,360,935. The impeller blades 45c and the turbine blades 50c are mounted in one of the pair of radial flow portions of the circuit 20, with the impeller blades disposed radially inwardly of the turbine blades. The reactor blades 55c are mounted in the other radial flow portion of the circuit 20.

Figure 11:
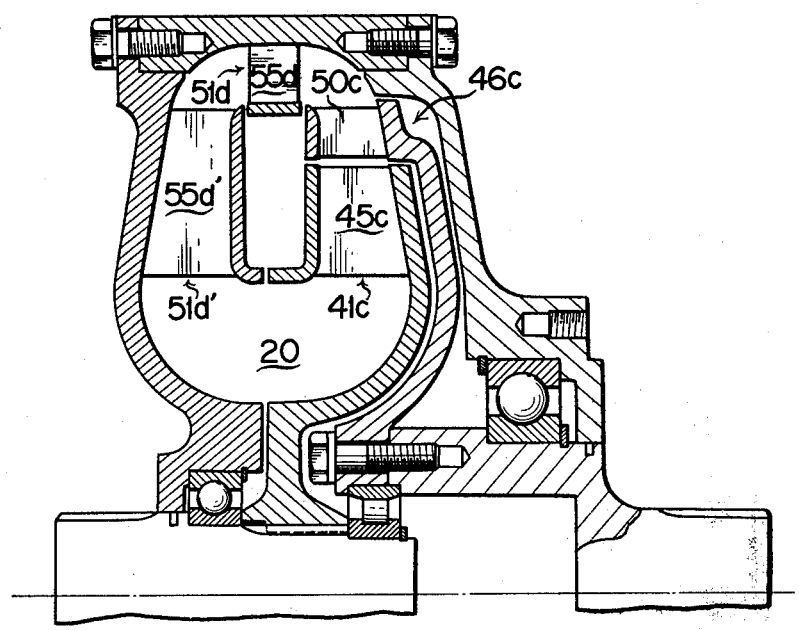

FIG. 11 shows a further torque converter also incorporating the original toroidal circuit 20. This converter comprises an impeller member 41c, turbine member 46c, first reactor element 51d, and second reactor element 51d', which are arranged as disclosed, for example, in the mentioned Japanese Patent Publication No. 38-10468. The impeller baldes 45c and the turbine blades 50c are mounted in one of the radial flow portions of the circuit 20, with the impeller blades disposed radially inwardly of the turbine blades. The first reactor blades 55d are mounted in the outer, axial flow portion of the circuit 20. The second reactor blades 55d' are mounted in the other radial flow portion of the circuit 20.

A comparison of FIGS. 10 and 11 will show that all but the reactors of the component parts of the two converters are of identical construction.

Figure 12:
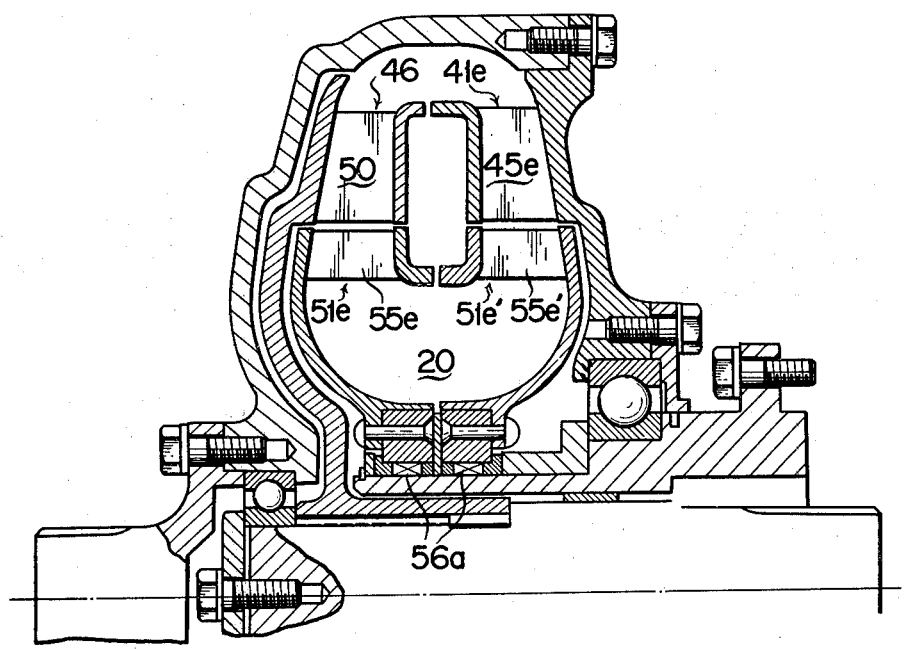

FIG. 12 shows a further torque converter incorporating the original toroidal circuit 20. Also of the dual reactor type, the converter comprises an impeller member 41e, turbine member 46, first reactor element 51e, and second reactor element 51e', which are arranged in accordance with the teachings of the mentioned Dundore et al. U.S. Pat. No. 3,105,396. The impeller blades 45e and the second reactor blades 55e' are mounted in one of the radial flow portions of the circuit 20, with the impeller blades disposed radially outwardly of the second blades. The turbine blades 50 and the first reactor blades 55e are mounted in the other radial flow portion of the circuit 20, with the turbine blades disposed radially outwardly of the first reactor blades. The turbine member 46 is identical to the turbine members of the FIGS. 3, 7, 8 and 9 converters.

Also included in the FIG. 12 converter are two overrunning clutches 56a on which the first 51e and second 51e' reactor elements are mounted respectively. The overrunning clutches 56a are disposed radially inwardly of the circuit 20 for reduction of the axial converter length. As mentioned, this is impossible with the Dundore et al. converter.

Figure 13:
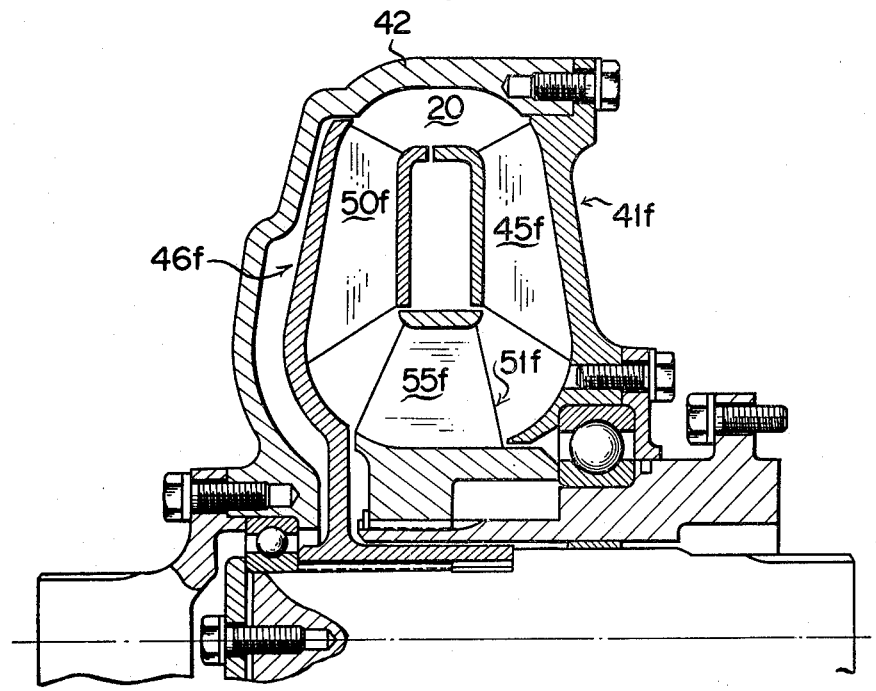

FIG. 13 shows a further torque converter also incorporating the original toroidal circuit 20. The converter comprises an impeller member 41f, turbine member 46f, and reactor member 51f, which are arranged as taugh by the mentioned Schneider U.S. Pat. No. 3,125,857. The impeller blades 45f and the turbine blades 50f are mounted respectively in the two radial flow portions of the circuit 20. The reactor blades 55f are mounted in the inner, axial flow portions of the circuit 20.

The rotating housing 42 of the FIG. 13 converter can be identical with that of, for example, the FIG. 3 converter. Depending on desired performance characteristics, moreover, the impeller member 41f and turbine member 46f may be made identical with the corresponding members of the FIG. 3 converter.

Figure 14:
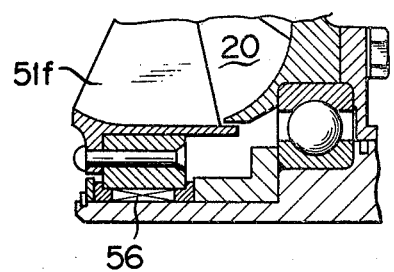
FIG. 14 is a fragmentary view showing the FIG. 13 converter as modified to include an overrunning clutch.

FIG. 14 shows a modification of the FIG. 13 converter, incorporating an overrunning clutch 56 on which the reactor member 51f is mounted. The clutch 61 is of course disposed radially inwardly of the circuit 20. The other details of construction are exactly as set forth above with reference to FIG. 13.

Figure 15:
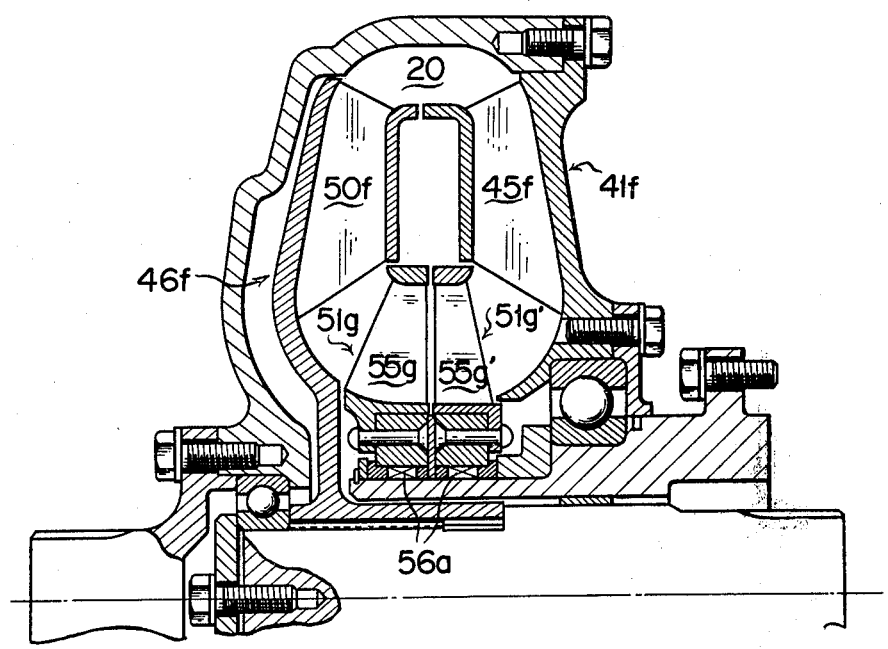
FIG. 15 is a fragmentary, radial sectional view of an additional torque converter also incorporating the original toroidal circuit of FIG. 1.

FIG. 15 shows a further torque converter incorporating the original toroidal circuit 20. The converter comprises an impeller member 41f, turbine member 46f, and first 51g and second 51g' reactor elements, of conventional arrangement. The impeller blades 45f and the turbine blades 50f are mounted respectively in the two radial flow portions of the circuit 20. The first 55g and second 55g' reactor blades are mounted in the inner, axial flow portion of the circuit 20. The first 51g and second 51g' reactor elements are mounted on respective overrunning clutches 56a which are both disposed radially inwardly of the circuit 20.

Except the first and second reactor elements and means directly associated therewith, all the component parts of this FIG. 15 converter can be of identical construction with the corresponding parts of the FIG. 13 converter.

It will have been noted from the foregoing description of several different torque converters, all constructed in accordance with the improved shape of the toroidal circuit according to our invention, that the converters can be built of many standardized arts. Our invention also makes possible the standardization of the dies for the casting of bladed converter members or elements, if not the members or elements themselves. For example, the impeller members 41 and 41b in the converters of FIGS. 3 and 8 may be cast by the use of the same dies. For use in the FIG. 3 converter, the cast impeller member may have the axial length of its core reduced to a required degree by subsequent machining.

Although the universal toroidal circuit for hydraulic torque converters according to our invention has been shown and described in highly specific aspects thereof, modifications will readily occur to those skilled in the art, including additional converters incorporating the circuit. It is therefore our intention that the scope of protection afforded hereby shall be limited only insofar as such limitations are expressly set forth in the appended claims.

We claim:

1. A hydraulic torque converter comprising an impelller member, a turbine member, and a reactor member, each of the impeller, turbine and reactor members including a shell and a core and a plurality of blades bridged therebetween, the shells and cores of the impeller, turbine and reactor members forming at least parts of the outer and inner walls, respectively, of a toroidal circuit in which a working fluid is recirculated, the shape of the circuit in a radial plane of the converter being related by reference to a construction trapezoid and a construction rectangle which are determined by a system of rectangular coordinates with the axis of the converter taken as the X-axis and a line perpendicular thereto as the Y-axis, the construction trapezoid being bounded by lines connecting, in the order given, a series of design points A, B, C and D which are expressed approximately as A(0.1737 R, 1.0000 R), B(0.2883 R, 0.3500 R), C(−0.2883 R, 0.3500 R), and D(−0.1737 R, 1.0000 R), wherein R is the maximum radius of the circuit, the construction rectangle being bounded by lines connecting, in the order given, another series of design points E, F, G and H which are expressed approximately as E(0.0815 R, 0.8945 R), F(0.0815 R, 0.5677 R), G(−0.0815 R, 0.5677 R), and H(−0.0815 R, 0.8945 R), the shape of the outer wall of the circuit being defined by rounding the corners at the design points A and D of the construction trapezoid with arcs having radii of approximately 0.1576 R and by rounding the corners at the design points B and C of the construction trapezoid with arcs having radii of approximately 0.2000 R, the shape of the inner wall of the circuit being defined by rounding all the four corners of the construction rectangle with arcs having radii of approximately 0.0400 R, the outer and inner walls of the circuit being tangent to an infinite number of circles the diameter di of each of which is expressed approximately by the formula:

$$di = \frac{0.2\pi R^2}{2\pi yi}$$

wherein yi is the radial distance of the center of each circle from the converter axis.

2. A hydraulic torque converter according to claim 1, wherein the shape of the toroidal circuit is subject to modifications such that the axial lengths of the radially outer, and radially inner, axial flow portions of the circuit are changed to the same extent.

3. A hydraulic torque converter according to claims 1 or 2, wherein the blades of the impeller member are mounted in one of the two radial flow portions of the toroidal circuit, and wherein the blades of the turbine and reactor members are mounted in the other radial flow portion of the circuit, with the turbine blades disposed radially outwardly of the reactor blades.

4. A hydraulic torque converter according to claim 3, wherein the reactor member is mounted on an overrunning clutch which is disposed radially inwardly of the toroidal circuit.

5. A hydraulic torque converter according to claim 3, wherein the reactor member is axially movable between a working and a retracted position, the reactor member being adapted to substantially close the toroidal circuit when moved to the retracted position.

6. A hydraulic torque converter according to claims 1 or 2, wherein the blades of the impeller and turbine members are mounted in one of the two radial flow portions of the toroidal circuit, with the impeller blades disposed radially inwardly of the turbine blades, and wherein the blades of the reactor member are mounted in the other radial flow portion of the circuit.

7. A hydraulic torque converter according to claims 1 or 2, wherein the reactor member is split into a first and a second reactor element, wherein the blades of the impeller and turbine members are mounted in one of the two radial flow portions of the toroidal circuit, with the impeller blades disposed radially inwardly of the turbine blades, wherein the blades of the first reactor element are mounted in the radially outer, axial flow portion of the circuit, and wherein the blades of the second reactor element are mounted in the other radial flow portion of the circuit.

8. A hydraulic torque converter according to claims 1 or 2, wherein the reactor member is split into a first and a second reactor element, wherein the blades of the impeller member and the second reactor element are mounted in one of the two radial flow portions of the toroidal circuit, with the impeller blades disposed radially outwardly of the second reactor blades, and wherein the blades of the turbine member and the first reactor element are mounted in the other radial flow portion of the circuit, with the turbine blades disposed radially outwardly of the first reactor blades.

9. A hydraulic torque converter according to claim 8, wherein at least either of the first and second reactor elements is mounted on an overrunning clutch which is disposed radially inwardly of the toroidal circuit.

10. A hydraulic torque converter according to claims 1 or 2, wherein the blades of the impeller member and the blades of the turbine member are mounted respectively in the two radial flow portions of the toroidal circuit, and wherein the blades of the reactor member are mounted in the radially inner, axial flow portion of the circuit.

11. A hydraulic torque converter according to claim 10, wherein the reactor member is mounted in an overrunning clutch which is disposed radially inwardly of the toroidal circuit.

12. A hydraulic torque converter according to claims 1 or 2, wherein the reactor member is split into a first and a second reactor element, wherein the blades of the impeller member and the blades of the turbine member are mounted respectively in the two radial flow portions of the toroidal circuit, an wherein the blades of the first and second reactor elements are mounted in the radially inner, axial flow portion of the circuit.

13. A hydraulic torque converter according to claim 12, wherein at least either of the first and second reactor elements is mounted on an overrunning clutch which is disposed radially inwardly of the toroidal circuit.

* * * * *